United States Patent

Marquez

(10) Patent No.: US 7,894,108 B2
(45) Date of Patent: Feb. 22, 2011

(54) SYSTEM FOR MATCHING OUTPUTS OF MULTIPLE DIGITAL PRINTERS

(75) Inventor: Cesar R. Marquez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1235 days.

(21) Appl. No.: 11/008,492

(22) Filed: Dec. 9, 2004

(65) Prior Publication Data

US 2006/0126133 A1 Jun. 15, 2006

(51) Int. Cl.
*H04N 1/00* (2006.01)
*H04N 1/46* (2006.01)

(52) U.S. Cl. ........................................ 358/504; 358/505
(58) Field of Classification Search ........................ None
See application file for complete search history.

(56) References Cited

U.S. PATENT DOCUMENTS

| | | | | |
|---|---|---|---|---|
| 6,091,518 A | 7/2000 | Anabuki | ..................... | 358/500 |
| 6,157,735 A | 12/2000 | Holub | ........................ | 382/167 |
| 6,256,111 B1* | 7/2001 | Rijavec | ...................... | 358/1.9 |
| 6,633,410 B1* | 10/2003 | Narushima | .................. | 358/1.9 |
| 6,709,085 B2* | 3/2004 | Hoshino et al. | ............... | 347/19 |
| 7,209,249 B2* | 4/2007 | Morita | ...................... | 358/1.15 |
| 2004/0030709 A1* | 2/2004 | Smith | ......................... | 707/102 |
| 2005/0243335 A1* | 11/2005 | Giesselmann | .............. | 358/1.9 |

\* cited by examiner

*Primary Examiner*—David K Moore
*Assistant Examiner*—Marcus T Riley
(74) *Attorney, Agent, or Firm*—Matthew C. Loppnow; PRASS LLP

(57) ABSTRACT

A system controls multiple digital printers, each printer including a processor, which processes incoming image data to be printed, and an engine, which places marks on a print sheet. A system-wide database includes a software portion, which contains data relating to the processors in the various printers, and a hardware portion, which contains data relating to the various engines. A central control system can recognize, for each printer, whether a condition within the printer is primarily hardware- or software-related, and influence the printer accordingly.

18 Claims, 1 Drawing Sheet

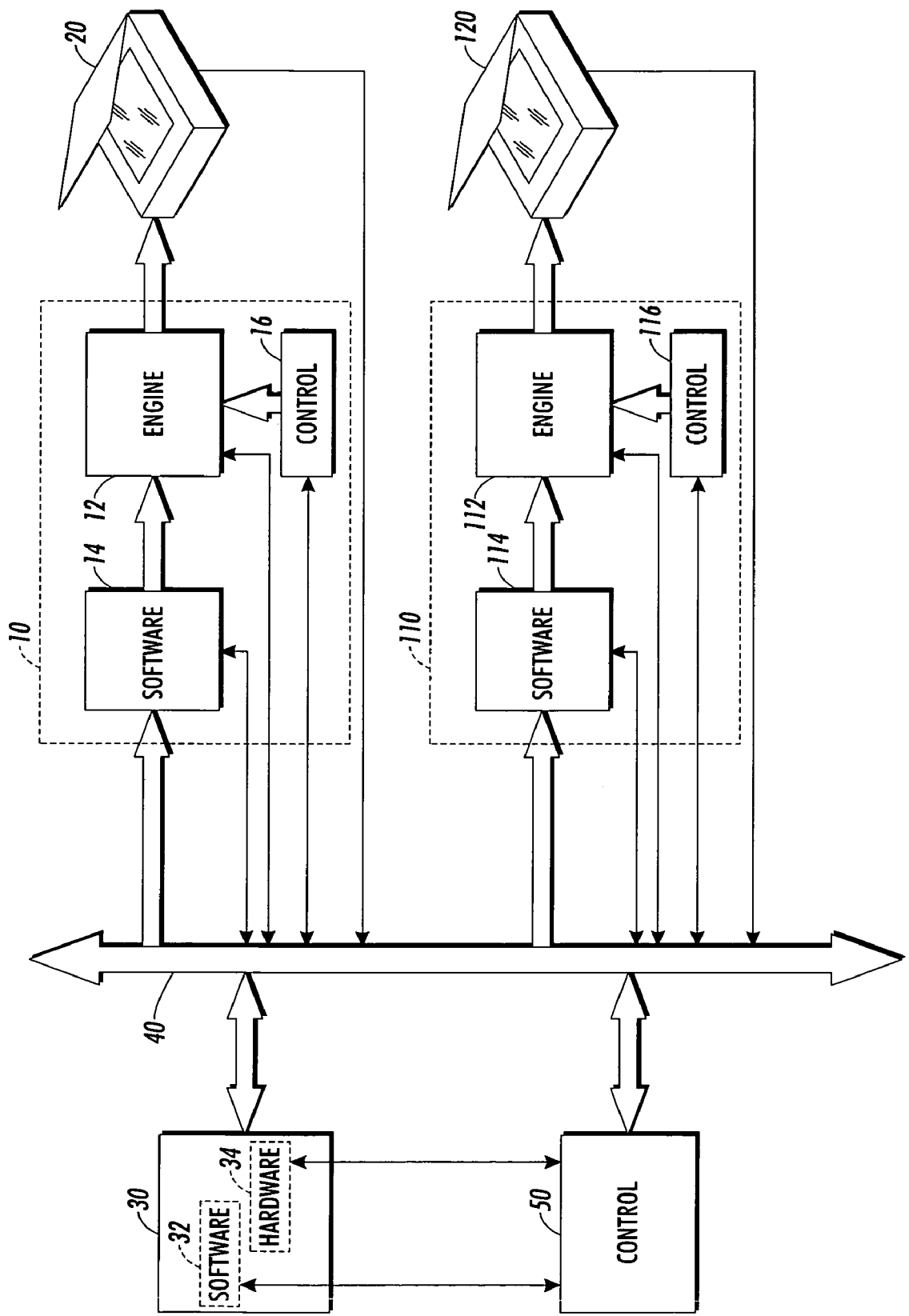

SYSTEM FOR MATCHING OUTPUTS OF MULTIPLE DIGITAL PRINTERS

TECHNICAL FIELD

The present disclosure relates to systems for controlling multiple digital printing machines.

BACKGROUND

In digital printing, data relating to an image, or the images of a multi-page document, originates in a host computer and is sent to a digital printer. The digital printer typically includes what can be called a "software" component, and a "hardware" component including a marking engine, which responds to signals to place marks on a sheet consistent with the image data. The software component typically receives image data form the host computer in a highly specialized format, such as JPEG or in a page description language such as a PDL. Typically, color information is retained by the host computer in a device-independent format such as $L^*a^*b^*$ color space, and then converted to a machine-operable format such as CYMK through one or more look-up tables associated with the printer. The software component within the printer interprets the received image data and thereby converts the data into a format more directly operative of the hardware, such as in a relatively simple compression format. The data that operates the hardware influences the hardware such as to cause a laser or an ink-jet printhead to operate at a particular time as a sheet is being fed through the hardware.

In addition, the marking engine, whether xerographic, ink-jet, or of some other type, has associated therewith any number of control systems to maintain a desired print quality, as is generally known in the art. Certain control systems influence specific physical conditions of the engine, such as, in the xerographic case, energy levels associated with charging, exposure, and/or development. In a basic case, the control systems operate to cause the printer hardware to approach an ideal print quality output that relates to the input image data sent from the host computer.

An emerging trend in digital printing is parallel printing, which can be defined as operating a plurality of printers to output a set of printed sheets which can subsequently be combined, such as by binding or otherwise; or for which it is generally desired that there be consistency in print appearance. In such a case, and especially with color printing, it becomes desirable to have all of the printers output prints which appear to be consistent with each other, such as in color palette, line width, and other attributes. Whereas with a single printer, the control system is designed to approach an ideal of the original data, when multiple printers are involved, the approach to the original image data is to some extent overruled by the need to make the outputs of several printers consistent: the need for consistency may require that one or all printers to some extent output "sub-optimal" print quality.

U.S. Pat. No. 6,157,735 is largely directed to the problem of maintaining a consistent color output among multiple printers. In the described system, "color calibration data" is transmitted variously around a network of printers, spectrophotometers, and computers. However, this color calibration data is purely on the software level, largely concentrating on the conversion of color data to device-dependent space.

U.S. Pat. No. 6,091,518 shows another system in which "color correction data" is passed over a network.

SUMMARY

According to one aspect, there is provided a method of controlling a first printer and a second printer, the first printer having a first engine, the first engine being describable by a first hardware response, and a first processor, the first processor being describable by a first software response, and the second printer having a second engine, the second engine being describable by a second hardware response, and a second processor, the second processor being describable by a second software response. A software database contains data relating to the first software response and first hardware response, and a hardware database contains data relating to the second software response and second hardware response. At least one of the first processor and the first engine is influenced based on data from the software database and the hardware database.

BRIEF DESCRIPTION OF THE DRAWING

FIG. 1 is a diagram showing flows of data in a multi-printer system.

DETAILED DESCRIPTION

FIG. 1 is a diagram showing flows of data in a multi-printer system. In the diagram, there are provided two printers, here indicated as 10 and 110; of course, in a practical embodiment, there may be a large number of printers, which may be distributed over a wide geographic area. Printer 10 includes an engine 12; a processor 14, which includes an interpreter or equivalent device, and which largely operates in the software realm; and what can be called a control system 16. For present purposes engine 12 can be defined as that which directly causes marks of a certain kind to be placed on a sheet passing therethrough; in a current practical embodiment, engine 12 receives image data in an interpreted, but possibly compressed, form. (The discussion of printer 10 and the elements therein also applies to printer 110 and its analogous elements, marked as 112, 114, 116.)

The processor 14 can be defined as the entity, based in software and hardware, which accepts image data and converts the image data into a form that can be used by the engine 12. Processor 14 typically includes an "interpreter" or "raster image processing" program which operates on incoming image data. Processor 14 typically further includes (as part of the interpreter or otherwise) a color rendering program, by which desired colors mandated by the image data are obtained by determining mixtures of colorants available to engine 10; this color rendering typically also includes aspects of undercolor removal (UCR) or gray component replacement (GCR), which may affect the overall appearance of color prints output by printer 10.

Control system 16 can be defined as the entity, based in software or hardware, which monitors and controls physical conditions within engine 12. In the xerographic context, such conditions may include initial charging potential of the photoreceptor; energy associated with an exposure laser or imaging bar; potential associated with development; potential associated with transfer; fuser temperature; and any others familiar in the art, and which may be specific to one of many color imaging stations within the engine. Of course, other types of marking engines, such as ink-jet, will have their own parameters. Other parameters that may be measured or otherwise taken into account by control system 16 include the age of a particular quantity of marking material such as toner, the identity (such as manufacturer and/or a batch serial number or similar information) of marking material, and ambient temperature and humidity. Control system 16 includes any number of feedback loops by which the engine 12 is caused to approach, in print quality output, the image data which is sent thereto from processor 14. The transfer of data associated with these feedback loops can be in effect overheard and used to monitor the overall performance of engine 12, and further can be influenced externally.

As can be seen in FIG. 1, there are provided two printers, 10 and 110, each with analogous elements therein. In a population of printers, different printers such as 10 and 110 may be located in different geographic locations, may be of different makes or models, and may rely on different marking technologies, such as xerographic and ink-jet. In a situation where it is desired to have multiple printers, such as the two printers, 10 and 110, output prints that, in print appearance, approach each other, the printers must to some extent be coordinated. To effect this coordination, the two printers 10 and 110 are associated with a central controller, with which they communicate over a network. (As used herein, the "appearance" of a print can relate to any visible aspect of the print; the "quality" of a print is the appearance of the print as compared to some standard. When it is desired that the output print appearance of one printer match the output print appearance of another printer in one or more aspects, it is said that one output of one printer "approaches" the output of the other.)

Further shown in FIG. 1 is a server 30, which communicates with printers 10, 110 over a network, generally symbolized as 40. The server 30 may be embodied in one or more computers, need not be associated with any computer which sends image data to any printers, and as shown includes databases of two types: a software database 32 and a hardware database 34. These databases can be commingled in one or more files, but there should exist data related to software and data related to hardware, as these terms are defined. These databases relate to any printers that may be called upon to output prints, whether accessible over a network or otherwise.

The software database 32 includes information, for each available printer, relating to the "software response" of each printer. The software response can be defined as data relating to aspects of a relationship between input image data and the post-processed image data sent to an engine such as 12. These aspects of the relationship can include a device-dependent color output versus a device-independent color input; the extent of UCR, GCR, or similar colorant selections; font selections and substitutions; compression aspects of the processed data; look-up tables and color profiles for specific models of printers or individual printers; color separation compression; and dot/line angular orientations.

The hardware database 34 includes information, for each available printer, relating to the "hardware response" of the printer. The hardware response can be defined as data describing an aspect of a relationship between any inputs to the engine (such as the processed image data, as well as physical conditions and parameters) and the quality or appearance of an output print. These aspects of the relationship can include a measured color output versus an input color; measured line width in one dimension versus the line width in the image data; density of test patches versus data for creating a test patch of a predetermined target density; separation calorimetric response such as Lac/LCh/Luv values, and data relating to dot gain. Other parameters that may be retained in the hardware database include the "age" of a particular quantity of marking material such as toner, the identity (such as manufacturer and/or a batch serial number or similar information) of marking material, and ambient temperature and humidity; also, information about any particular sheet or substrate on which images are printed, e.g., whether a sheet drawn at a certain time for printing is bond, coated, transparency, etc. Also included in hardware data can be information relating to the make and model of the printer, and what type of printing technology it uses.

Also possibly included in the hardware data for a given printer is a relationship between a physical parameter associated with the engine such as 12 at any time and any aspect of the print quality or appearance of an output print; such parameters that may change over a reasonably short time frame can be called "real-time parameters." In a xerographic case, such parameters can include an initial charging potential of the photoreceptor; energy associated with an exposure laser or imaging bar; potential associated with development; potential associated with transfer; fuser temperature; and any others familiar in the art, and which may be specific to a one of many color imaging stations within the engine. Of course, other types of marking engines, such as ink-jet, will have their own real-time parameters. These real-time parameters can be in effect "overheard" by data flows relating to the control system 16 governing the individual printer.

In order to determine the actual print quality or appearance of prints being output by a printer at a certain time, with certain input image data, and under certain conditions, there can be provided a scanner such as 20 or 120 for recording the actual printed image data. Such a scanner can be in-line with a printer or simply be available to a human user near a particular printer for taking print quality measurements as desired. The scanner records the hard-copy image from an output print from the printer. There can be produced and scanned test sheets of predetermined design at various times. The scanner can be of a general design familiar in the art, and can include elements of the image scanner forming part of a printer such as 10 that is also a digital copier. A spectrophotometer can also be used, located either inside the printer 10 as part of the machine components, or external to the printer. The spectrophotometer can be directed at test patches or other images created on print sheets, or on some surface within the print engine, such as the photoreceptor in the xerographic case. Data can be sent directly from such an instrument through internal machine communications ports of the printer 10. (As used herein, the term "scanner" shall refer to any apparatus that records an image from a sheet or surface, and "scanning" shall refer to any recording of an image from a sheet or surface. Data of any kind derived from the scanning of an output sheet is called "print appearance data".)

The scanner such as 20 or 120 is also useful in identifying specific print defects beyond those associated with color reproduction. For example, the presence of streaks or bands on an output sheet, meaning lines in one direction or another that were not part of the intended image, can be detected with a scanner. In most situations, such lines are symptomatic of a malfunction of a marking engine as opposed to a processor. A control system such as 50 interprets the detection of such lines as a malfunction of the engine that produced the scanned print, and initiates a countermeasure accordingly (such as by shutting off the particular engine, causing the engine to enter some sort of self-cleaning or maintenance mode, and/or informing a human user). Another type of print defect involves inconsistencies of color density within a single print sheet, or even within a single small test patch. For instance, a scanner such as 20 or 120 can detect undulations, such as in the millimeter range, of varying color density within a single color test patch, and these undulations are typically the result of a defect in the engine, once again as opposed to a defect in the processor. In such a case, control system 50 can adapt countermeasures directed specifically to the engine that produced the scanned print.

It can be seen in FIG. 1 that each printer such as 10 or 110 is connected to a network 40, for communication of both image data for printing and data related to systems for maintaining print quality. As further can be seen in this embodiment, each element with each printer, such as engine 12, processor 14, and control system 16, is itself in communication with network 40: each element may have its own internet address, but this is not necessary. The various elements in the various printers populate the respective databases 32 and 34 over time.

Software database 32 and hardware database 34 are used by a central control system 50 when it is desired to match or otherwise coordinate outputs from multiple printers such as 10 and 110. Control system 50 accesses both the software database 32 and hardware database 34: by accessing both types of data, the control system influences the engine 12 or processor 14 independently or together as needed to obtain a desired print appearance from printer 10, such as to approach the appearance of prints from printer 110.

Following are some scenarios by which a combination of hardware and software data is monitored or influenced in a multi-printer context.

1) Printer 10 is identified in the hardware database 34 as a xerographic printer of a certain make and model and printer 110 is identified in the hardware database 34 as an ink-jet printer of a certain make and model. In this case, the model of the ink-jet printer 110 is known (such as in hardware database 34) to have very limited flexibility in terms of altering print quality or appearance by changing any hardware parameters. Therefore, control system 50 causes the print appearances of printers 10 and 110 to approach each other by influencing either the processor 114 of printer 110 (in effect largely avoiding trying to influence engine 112), or either of the processor 14 or engine 12 of printer 10.

2) Printer 10 is identified in the hardware database 34 as a xerographic printer of a certain make and model and printer 110 is identified in the hardware database 34 as an ink-jet printer of a certain make and model. In this case, the model of the ink-jet printer 110 is known (such as in hardware database 34) to have an engine 112 with a limited printer gamut, smaller than the gamut of the engine 12 of printer 10. Therefore, control system 50 controls the processor 14 of xerographic printer 10 to output color selections to engine 12 that are within the gamut of engine 112 of ink-jet printer 110. In effect, the smallest-gamut engine is caused to be a constraint on color selections for the multi-printer system, but this facilitates an approaching of print appearance for printers in the system.

3) Control system 50 detects that the data from scanner 20 related to a recent output print is beyond a certain tolerance (such as in color reproduction, line width, or some other print-quality metric) from the data sent to the engine 12 from processor 14. The control system 50 can thus isolate a problem to the engine 12, and then alter parameters, such as potentials, associated with engine 12 (through control system 16) to approach a desired print output appearance.

4) Following attempts through control system 50 to influence engine 12 to output prints of satisfactory appearance (such as to approach prints from printer 110 or otherwise), the control system 50 can decide to direct a print job, or a portion of a print job, from printer 10 to printer 110.

5) Control system 50 detects that a certain quantity of marking material, such as toner of one or more primary colors, is older than a predetermined age for suitably accurate rendering of a selected color by engine 12, and notifies a human user, such as by electronic mail. The processor 14 is influenced substantially not at all.

6) Control system 50 detects, by the scanning by scanner 20 of a test print output by printer 10, certain streaks on the print which the control system 50 recognizes as likely to be the result of a hardware malfunction in engine 12, and notifies a human user, such as by electronic mail. The processor 14 is influenced substantially not at all. The presence of certain streaks, bands, marks or other irregularities can be considered evidence that the scanned print is outside a predetermined image quality range.

7) Control system 50 detects, by monitoring control system 16, that a certain parameter within engine 12 is consistently operating at a level characteristic of a hardware malfunction, such as with a high energy of an imaging laser or a high fuser temperature (even if the print output, as measured with scanner 20, remains acceptable), and notifies a human user, such as by electronic mail. If the parameter is monitored to be out of a predetermined range, the printer can be shut down and incoming jobs sent to another available printer.

In using software database 32 and hardware database 34 for each of a population of printers, control system 50 exploits hardware and software response models to attain a desired print appearance for a particular printer. These response models can be based on known makes and models of printers or printer components such as print drivers, and can be augmented by statistical models based on actual use of a particular printer, or of a population of printers of a certain type.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of controlling a first printer and a second printer, the first printer having a first engine, the first engine being describable by a first hardware response, and a first processor, the first processor being describable by a first software response, and the second printer having a second engine, the second engine being describable by a second hardware response, and a second processor, the second processor being describable by a second software response, comprising:
   providing a software database containing data relating to the first software response and first hardware response, and a hardware database containing data relating to the second software response and second hardware response;
   scanning an image from the first printer, yielding first print appearance data;
   scanning an image from the second printer, yielding second print appearance data; and
   influencing at least one of the first processor and the first engine based on the first appearance data and the second appearance data to cause the first printer to output a print appearance approaching the second print appearance data.

2. The method of claim 1, further comprising
   influencing only one of the first processor and the first engine based on data from the software database and the hardware database.

3. The method of claim 1, further comprising
   influencing at least one of the first processor and the first engine and at least one of the second processor and the second engine based on data from the software database and the hardware database.

4. The method of claim 1, further comprising
populating the hardware database with data relating to the first engine.

5. The method of claim 4, further comprising
populating the hardware database with predetermined data relating to a model of the first printer.

6. The method of claim 4, further comprising
populating the hardware database with data derived from operation of the first printer.

7. The method of claim 1, the influencing including
constraining a color selection sent from the first processor to the first engine, based on a hardware response of the second engine.

8. The method of claim 1, further comprising
scanning an image output from the first printer;
determining that the image output from the first printer is outside a predetermined image quality range; and
influencing the first engine in response to the determining.

9. The method of claim 8, further comprising
not influencing the first processor in response to the determining.

10. The method of claim 8, further comprising
informing a user in response to the determining.

11. The method of claim 8, further comprising
directing a portion of a print job to the second printer in response to the determining.

12. The method of claim 1, the hardware response including data relating to at least one of a measured color output; line width; density of a test patch; separation colorimetric response, and dot gain.

13. The method of claim 1, the hardware response including data relating to at least one of an age of marking material, identity of marking material, ambient temperature, ambient humidity, and information about a substrate on which images are printed.

14. The method of claim 1, the software response including data relating to at least one of a device-dependent color output versus a device-independent color input; colorant selection; font selection; font substitution; color profiles for models of printers; color profiles for individual printers; color separation compression; and angular orientations.

15. A method of controlling a first printer and a second printer, the first printer having a first engine, the first engine being describable by a first hardware response, the first printer having a first engine a first processor, the first processor being describable by a first software response, and the second printer having a second engine, the second engine being describable by a second hardware response, the second printer having a second processor, the second processor being describable by a second software response, the method comprising:
providing a software database in a central control system separate from the first printer and the second printer, the software database containing data relating to the first software response and first hardware response, and a hardware database containing data relating to the second software response and second hardware response;
receiving, over a network at a central control system, first print appearance data from a first scanned image of an image printed from the first printer;
receiving, over a network at a central control system, second print appearance data from a second scanned image of an image printed from the second printer; and
influencing, by the central control system, at least one of the first processor and the first engine based on data from the software database, the hardware database, and both the first appearance data and the second appearance data to cause the first printer to output a first print appearance approaching a second print appearance of the second printer.

16. The method according to claim 15, wherein providing comprises providing a software database in a central control system at a location remote from the first printer and the second printer, the software database containing data relating to the first software response and first hardware response, and a hardware database containing data relating to the second software response and second hardware response.

17. The method according to claim 15, wherein influencing comprises influencing, by the central control system, at least one of the first processor and the first engine based on data from the software database, the hardware database, the first appearance data, and the second appearance data to cause the first printer to output a print appearance color approaching a second print appearance color of the second printer.

18. The method according to claim 15, wherein influencing comprises influencing, by the central control system, at least one of the first processor and the first engine based on data from the software database, the hardware database, the first appearance data, and the second appearance data to cause the first printer to output color selections that are within a gamut of the second printer.

* * * * *